Dec. 29, 1942.  A. H. KING  2,306,956
VIBRATION SUPPRESSOR
Filed Sept. 9, 1939
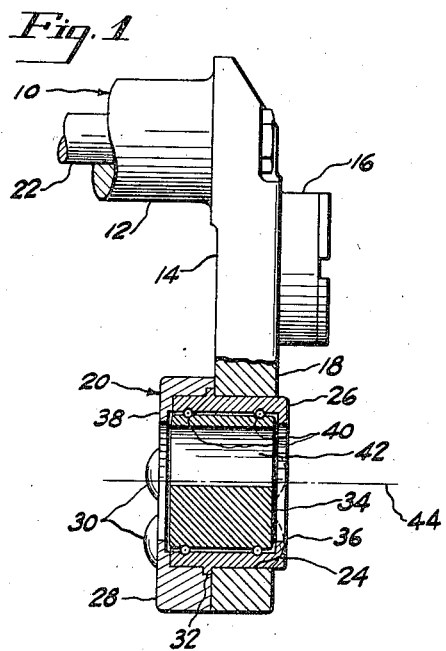
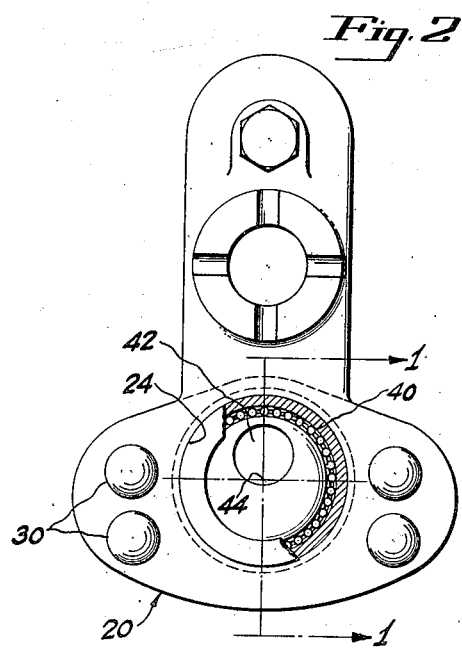
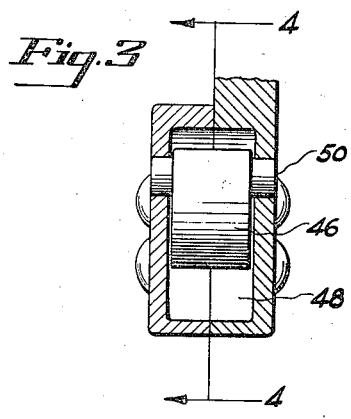
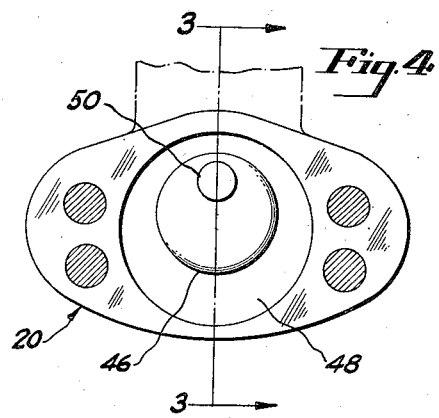
INVENTOR.
Alexander H. King
BY Harris G. Luther
ATTORNEY Patented Dec. 29, 1942

2,306,956

UNITED STATES PATENT OFFICE 2,306,956

VIBRATION SUPPRESSOR

Alexander H. King, West Hartford, Conn., assignor to United Aircraft Corporation, East Hartford, Conn., a corporation of Delaware Application September 9, 1939, Serial No. 294,173

3 Claims. (Cl. 74—604)

This invention relates to improvements in vibration suppressing means and has particular reference to an improved device for suppressing low order torsional vibrations in rotating bodies.

An object of the invention resides in the provision in a rotating body of a dynamically acting mass which will not materially affect the dynamic balance of the rotating body but which will operate to suppress very low order frequencies of torsional vibrations to which the rotating body is subjected.

A more specific object resides in the provision in an engine crankshaft of a dynamic vibration balancer which is effective to suppress torsional vibration frequencies in the range between the orders of one and one-half and three and one-half cycles per crankshaft revolution.

Other objects and advantages will be more particularly pointed out hereinafter or will become apparent as the description proceeds.

In the accompanying drawing in which like reference numerals are used to designate similar parts throughout, there are illustrated, by way of example, two slightly different mechanical arrangements for the purpose of disclosing the invention. The drawing, however, is for the purpose of illustration only and is not to be taken as limiting the invention as it will be apparent to those skilled in the art that various changes may be made in the illustrated construction without in any way exceeding the scope of the invention.

In the accompanying drawing,

Fig. 1 is a side-elevational view of a fragmentary portion of an engine crankshaft a portion being broken away and shown in section to illustrate the application of the improved vibration damper thereto.

Fig. 2 is an end elevation of the crankshaft shown in Fig. 1, a portion being broken away and shown in section to illustrate the application of the improved vibration damper thereto.

Fig. 3 is a sectional view of the damper containing portion of an engine crankshaft showing the application thereto of a somewhat modified form of vibration damper constructed according to the invention, and Fig. 4 is an elevational view of an engine counterweight containing the modified form of vibration damper shown in Fig. 3 with the cover plate for the damper removed.

Referring to the drawing in detail, the numeral 10 generally indicates an engine crankshaft such, for example, as is particularly adapted for a radial, internal combustion engine conventionally used for the propulsion of aircraft. The portion of the crankshaft illustrated includes a fragmentary portion of the crankpin 12, a rear crankcheek 14, a rear main bearing 16, and a rear counterweight 18 in which the vibration damper, generally indicated at 20, is mounted. In some cases the crankshaft may be made in two separable parts secured together by suitable means such as the bolt indicated at 22.

Somewhat similar forms of vibration dampers for suppressing higher order vibrations are already known to the prior art. One example of such a vibration damper is illustrated and described in the S. A. E. Journal for October, 1937, at page 465, in an article by George J. Mead entitled "Aircraft power-plant trends," beginning on page 455 of the journal referred to.

In the form of the invention shown in Figs. 1 and 2 the counterweight 18 is provided with an aperture 24 within which is set a bearing cage 26 of hardened material. A cover plate 28 is secured to the counterweight by suitable means such as the rivets 30 and the cage may be secured in the counterweight by an annular shoulder 32 received in a groove provided in the counterweight or cover plate at the plane of separation of these two elements. A cylindrical weight or puck 34 is received in the cage 26 and held therein by suitable means, such as an inturned flange 36 on one end of the cage and a flange 38 on the cover plate which extends across the respective end of the cage and overlaps the end portion of the weight 34 opposite the end overlapped by the cage flange 36. Any suitable anti-friction bearing such as a plain bearing, needle bearings, or, as shown in the drawing, conventional ball bearings 40, may be disposed between the cylindrical surface of the weight 34 and the adjacent surface of the cage to reduce friction between the weight and the cage. An aperture 42 is provided through the weight 34, eccentric to the center line 44 of the weight, to render the weight heavier upon one side of the center line than upon the other. This construction provides a weight in which the center of mass of the weight is at one side of the center of rotation thereof. When the crankshaft is rotated the heavy side of the weight will swing outwardly and, when the weight is acted on by centrifugal force, its moment of inertia will be much greater than that of a solid weight of the same mass since, in the case illustrated, the weight acts on a compound pendulum principle having one center at the axis of rotation of the crankshaft and a second center at the axis of rotation of the weight. This increase in the moment of inertia slows down the natural frequency of the weight when acting as a pendulum and thus renders the weight responsive to a lower order of harmonic torsional vibration of the crankshaft.

In the form shown in Figs. 3 and 4 a solid weight 46 is mounted in a counterweight cavity 48 on a bearing pin 50 which is eccentric with respect to the center line of the weight and is received at its projecting ends in suitable bearing apertures provided in the opposite walls of the cavity 48. In this construction the weight oscillates about the axis of the pin 50 with an increased moment of inertia due to the eccentricity of the pin, to respond to low order harmonic torsional vibrations in the manner indicated above in connection with the forms shown in Figs. 1 and 2.

While two slightly different mechanical arrangements have been hereinabove described and illustrated in the accompanying drawing for the purpose of disclosing the invention, it is to be understood that the invention is not limited to the particular constructions so illustrated and described, but that such changes in the size, shape and arrangements of the various parts may be resorted to as come within the scope of the subjoined claims.

Having now described the invention so that others skilled in the art may clearly understand the same, what it is desired to secure by Letters Patent is as follows:

1. In combination with an engine crankshaft having a counterweight, a dynamic vibration suppressor consisting of a cylindrical bushing fixed in a cavity in said counterweight, and said bushing having its axis of rotation fixed relative to said cavity, said weight having a cut away portion at one side of the rotational center thereof to place the center of mass of said weight on the opposite side of said rotational center from the axis of rotation of said crankshaft when said crankshaft is rotated.

2. In combination with an engine crankshaft having a counterweight, a dynamic vibration suppressor consisting of a unitary cylindrical weight of a mass sufficient to complete the required mass of said counterweight rotatably mounted in a cylindrical cavity in said counterweight and having its axis of rotation fixed relative to said cavity, said weight having a cut away portion at one side of the rotational center thereof to place the center of mass of said weight on the opposite side of said rotational center from the axis of rotation of said crankshaft when said crankshaft is rotating, and an anti-friction bearing between the periphery of said weight and the wall of said cavity.

3. In combination with an engine having a counterweight provided with a circular cavity, a dynamic vibration suppressor, consisting of a cylindrical weight freely rotatable in said cavity about an axis fixed relative to said cylindrical weight and said cavity, said weight having a cut-away portion at one side of the center of rotation thereof to give said weight a tendency to assume a definite position in said cavity when said crankshaft is rotated.

ALEXANDER H. KING.